United States Patent
Fischer et al.

(10) Patent No.: US 6,373,588 B1
(45) Date of Patent: Apr. 16, 2002

(54) BANNER PAGE DETECTION AND HANDLING MECHANISM

(75) Inventors: Todd A. Fischer; John L. Boldon, both of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/491,993

(22) Filed: Jan. 26, 2000

Related U.S. Application Data

(63) Continuation-in-part of application No. 08/974,745, filed on Nov. 19, 1997, now Pat. No. 6,075,617.

(51) Int. Cl.[7] .............................................. G06F 15/00
(52) U.S. Cl. ...................................... 358/1.16; 358/1.1
(58) Field of Search ............................... 358/1.1, 1.13, 358/1.15, 1.16, 1.18, 1.19, 400, 401, 402, 404, 443, 444, 408; 399/382

(56) References Cited

U.S. PATENT DOCUMENTS

| | | | |
|---|---|---|---|
| 5,504,843 A | | 4/1996 | Catapano et al. ........... 395/115 |
| 5,513,013 A | * | 4/1996 | Kuo ........................... 358/448 |
| 5,547,178 A | * | 8/1996 | Costello |
| 5,644,685 A | | 7/1997 | Baehr ......................... 395/111 |
| 5,659,164 A | * | 8/1997 | Schmid et al. .............. 358/403 |
| 5,704,602 A | | 1/1998 | Taylor et al. .............. 270/1.02 |
| 5,709,374 A | | 1/1998 | Taylor et al. .............. 270/1.02 |
| 5,710,874 A | | 1/1998 | Bergen ........................ 395/115 |
| 5,715,381 A | | 2/1998 | Hamilton ..................... 395/56 |
| 5,762,329 A | | 6/1998 | Nakazato et al. ........ 270/58.09 |
| 5,869,824 A | | 2/1999 | Okada et al. ............... 235/380 |

* cited by examiner

Primary Examiner—Arthur G. Evans
(74) Attorney, Agent, or Firm—Lane R. Simmons

(57) ABSTRACT

An image forming device comprises an input for receiving a print job data stream, a memory coupled to the input for storing at least a portion of the print job data stream, and detection apparatus coupled to the memory for detecting at least two classes of indicia indicative of a banner page within the at least a portion of the print job data stream. The image forming device further includes management apparatus coupled to the detection apparatus for managing usage of the banner page independent of other pages defined in the print job data stream.

45 Claims, 5 Drawing Sheets

PRINT JOB DATA STREAM WITH NESTED ENVELOPED BANNER PAGE

PRINT JOB DATA STREAM WITH ENVELOPED BANNER PAGE

PRINT JOB DATA STREAM WITH NON ENVELOPED BANNER PAGE

PRINT JOB DATA STREAM WITHOUT BANNER PAGE

BANNER PAGE DETECTION AND HANDLING MECHANISM

CROSS REFERENCE TO RELATED APPLICATIONS

This application is a continuation in part of U.S. application Ser. No. 08/974,745 filed Nov. 19, 1997. Now U.S. Pat. No. 6,075,617.

FIELD OF THE INVENTION

This invention relates in general to image forming devices and, more particularly, to improved detection and management of print job banner pages.

BACKGROUND OF THE INVENTION

Banner pages have long been associated with print jobs in shared print environments. A banner page is, typically, a printed sheet that separates one print job output from another. For example, a banner page may include the name or some other uniquely identifying feature of the user that submitted the print job, often in an eye-catching format, so that the user can easily find and separate his/her print job from the other jobs in the printer's output tray.

Traditionally, the use of banner pages has been relatively narrow in scope and purpose, reflecting the capabilities and intended use of the shared printers. For example, one banner page has typically been output on top of (or in association with) each print job submitted. If multiple copies of a particular job are requested, then multiple banner pages may also be produced. Essentially, the only option available has been whether to print the banner page with the job, or not. And, often, even that option is not adjustable by the user because it is pre-designated at the shared print server that spools the print job to the printer.

However, as technology has enabled more sophisticated printers, offering greater printing capabilities and document finishing options, the need for variations on managing the traditional banner page in connection with those print jobs has also increased. For example, certain higher end shareable printers now enable enhanced printing, known as multiple original copying (MOPYing), whereby a single print job is sent once to the printer yet printed multiple times and output in proper order as multiple copies of a "single" job. Additionally, extensive finishing operations, such as collation, binding, stapling and punching are now offered. Furthermore, some printers provide multi-resolution print capability so that a job may be printed in one of a selection of print resolution modes. In sum, these printers provide advanced shared printing, "copying", and selective document finishing functionality all in one.

To this regard, the options for using banner pages has not kept up with the sophisticated options of these printers. For example, if a single MOPY job is submitted with a request for a banner page, and the MOPY job is designated to produce three collated sets of one document, then each set would include a banner page for a total of three banner pages. Additionally, if each set is stapled, then each banner page would also be stapled to its respective document set. In this example, the output of three banner pages for the single MOPY job not only increases total print throughput time, but is resource wasteful and may not be desired by the user or necessary for identifying the single MOPY job. In other words, a single banner page for the single MOPY job may suffice but is not available. Moreover, the stapling of each banner page to each set is a further inconvenience to the user who usually discards the banner page. In this scenario, it may be more convenient to have the collated sets stapled, but not the banner page. Rather, the banner page could simply be placed unattached adjacent to the first (or last, depending on print output order) stapled document set. Additionally, in a multi-resolution capable printer, it would be beneficial if the banner page could be printed at a lower resolution to increase overall printer processing throughput in the event a subsequent print job is also to be printed at the lower resolution.

However, conventionally, it has not been easy to identify a banner page in a print job data stream that has been input to a printer from a host. As such, none of these improved banner page features are available in today's shared printer environments. This is due, in part, because in modern network printing environments the network printer may receive print data streams from multiple hosts, each of which may treat banner pages differently. Additionally, neither the conventional printer description language (PDL) commands that define a job nor the printer job language (PJL) commands that may envelope a job or a banner page explicitly define or identify a banner page as a banner page. The printer only sees an interpretable print job data stream, including, for example, PDL commands enveloped in PJL commands, but nothing that explicitly says "these PDL commands define a banner page" or "this PJL envelope identifies a banner page."

Thus, the difficulty of identifying a banner page associated with a print job data stream, in addition to the increasingly sophisticated print options being made available on newer shared printers, has notably left banner page management options lacking in today's printing environments.

Accordingly, an object of the present invention is to provide improved banner page detection and management options, especially for shared and sophisticated printing environments.

SUMMARY OF THE INVENTION

According to principles of the present invention in a preferred embodiment, an image forming device comprises an input for receiving a print job data stream, a memory coupled to the input for storing at least a portion of the print job data stream, and detection apparatus coupled to the memory for detecting at least two classes of indicia indicative of a banner page within the portion of the print job data stream. The classes of indicia detected include, selectively, a job boundary, complexity of a page, a page closing, indication of a "tacked on" page, or a differentiation of settings identified as between the first and second consecutive pages of the print job data stream.

The image forming device further includes management apparatus coupled to the detection apparatus for managing usage of the banner page independent of other pages defined in the print job data stream. Managed usage includes, selectively, controlling resolution of the banner page, controlling inclusion or exclusion of the banner page relative to the print job, controlling input tray selection and output tray designation for the banner page, controlling output quantity of the banner page, and so forth. Controlling the resolution of the banner page includes optimizing its resolution such that throughput of multiple print jobs in the image forming device is enhanced.

Other objects, advantages, and capabilities of the present invention will become more apparent as the description proceeds.

DETAILED DESCRIPTION OF THE INVENTION

Figure 1:
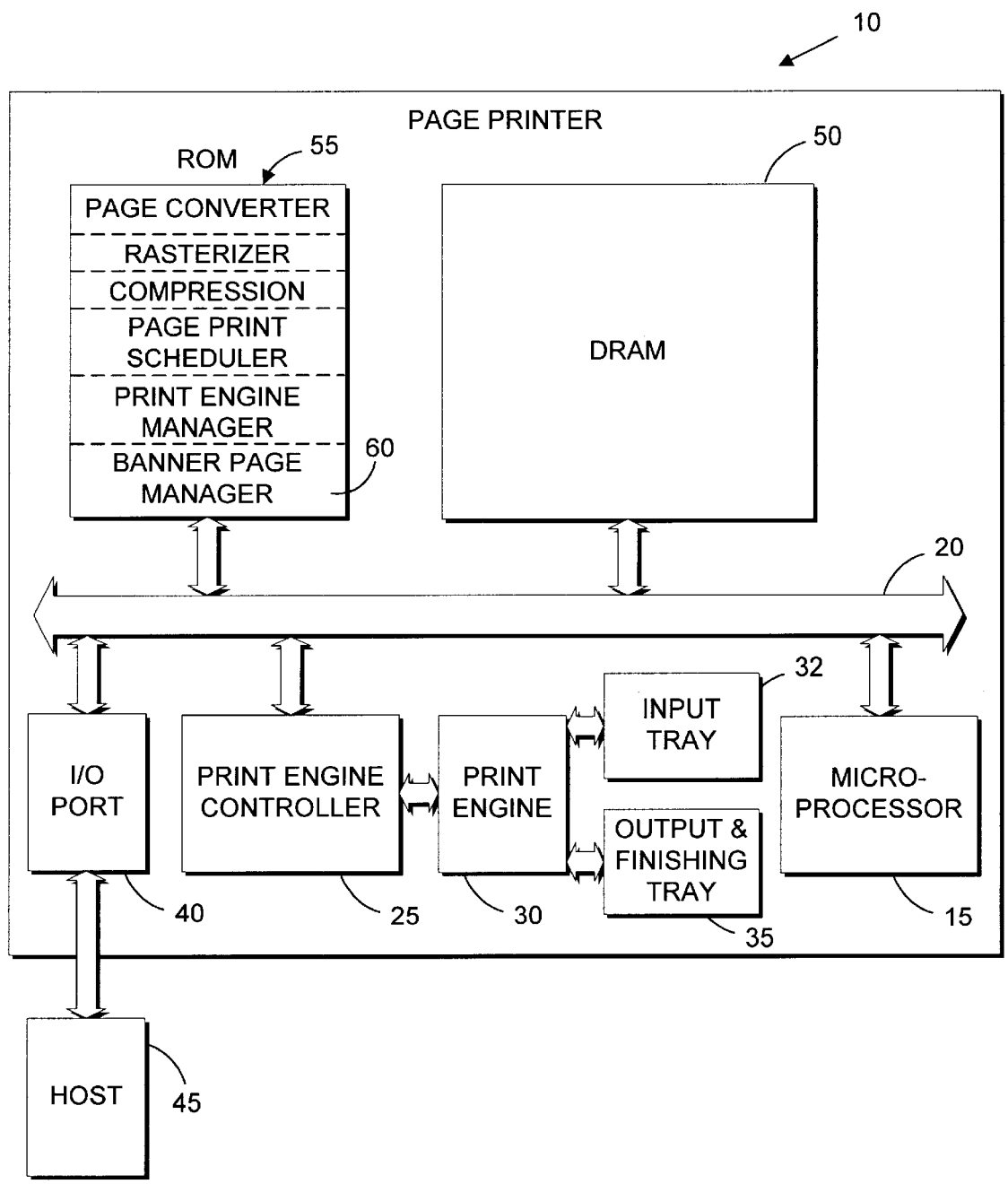
FIG. 1 is a block diagram of a printer embodying the present invention banner page detection and handling mechanism.

FIG. 1 is a high level block diagram of a page printer 10 incorporating the present invention banner page detection and management mechanism. The page printer 10 is controlled by a microprocessor 15 which communicates with other elements of the system via a bus 20. A print engine controller 25 and associated print engine 30 connect to bus 20 and provide the print output capability for the page printer. Sheet media is pulled from the input tray 32 into the print engine 30 and directed to the output and finishing tray 35. In a preferred embodiment, the output and finishing tray 35 includes, for example, finishing feature mechanisms such as sheet registration, binding, stapling, punching, and the like, and may include one or more bins for collation or "mailbox" usage purposes. The input tray 32 may also include one or more input trays for dynamic media selection.

Also in a preferred embodiment, the print engine 30 is a multi-resolution capable engine. For example, it can print, selectively, at 600 or 1200 dots per inch (dpi). For purposes of this disclosure, the print engine 30 is a laser printer that employs an electrophotographic drum and imaging system well known in the art. However, as will be obvious to those of ordinary skill in the art, the present invention is similarly applicable to other types of printers and/or imaging devices including, for example, inkjet printers, facsimile machines, copiers, or the like.

An input/output (I/O) port 40 provides communications between the page printer 10 and a host computer 45 and receives page descriptions (or raster data) in the form of a print job data stream from the host for processing within the page printer. A dynamic random access memory (DRAM) 50 provides a main memory for the page printer for storing and processing the print job data stream received from the host 45.

A read only memory (ROM) 55 holds firmware which controls the operation of the microprocessor 15 and page printer 10. The code procedures stored in ROM 55 may include conventional procedures such as a page converter, rasterizer, compression code, page print scheduler and print engine manager. It should be noted here that any one or more of the code procedures store in the ROM 55 could similarly be implemented in software or embedded in an application specific integrated circuit (ASIC), including the present invention banner page manager 60 discussed more fully subsequently herein.

The page converter firmware converts a page description received from the host to a display command list, with each display command defining an object to be printed on the page. The rasterizer firmware converts each display command to an appropriate bit map (rasterized strip) and distributes the bit map into memory 50. The compression firmware compresses the rasterized strips in the event insufficient memory exists in memory 50 for holding the rasterized strips.

In general, the operation of the page printer 10 commences when it receives a page description from host computer 45 via the I/O port 40 in the form of a print job data stream. The page description is placed in DRAM 50. The microprocessor 30 accesses the page description, line by line, and builds a display command list using the page converter firmware in the ROM 55. As the display command list is being produced, the display commands are sorted by location on the page and allocated to page strips in memory 50. When a page is closed for processing (i.e., all strips have been evaluated, rasterized, compressed, etc. for processing by the print engine 30) then the rasterized strips are passed to the print engine 30 by the print engine controller 25, thereby enabling the generation of an image (i.e., text/graphics etc). The page print scheduler controls the sequencing and transferring of page strips to the print engine controller 25. The print engine manager controls the operation of the print engine controller 25 and, in turn, the print engine 30.

Importantly, the ROM 55 includes a banner page manager procedure 60 for banner page detection and handling according to the present invention. The banner page manager 60 parses at least a portion of the print job data stream stored in DRAM 50 to detect at least two separate classes of indicia that, in combination, are indicative of a banner page. The indicia detected may include, for example, a job boundary, complexity of a page, a page closing, whether or not a page appears to be "tacked on" to the job, a differentiation of printer description language (PDL) used as between the first and second consecutive pages of the print job data stream, or a differentiation of any one of a number of print settings identified as between the first and second consecutive pages of the print job data stream.

A class of indicia identifies a grouping of one or more criteria that have a common trait or attribute. For example, a print settings page size class may include criteria such as letter size (8½×11 inches), legal size (11×14 inches), or standard A4 size. Or, a print settings finishing operations class may include criteria such as registering, binding, stapling or punching. Additionally, a PDL language class may include criteria such as PCL, PostScript, etc.

Advantageously, detecting at least two separate classes of indicia produces more accurate results in identifying a banner page over the prior art which has conventionally only monitored a single class of indicia. For example, it is known in the art to capture specially transmitted control characters to identify a banner page. Alternatively, it is known in the art to monitor a printer description language used to identify a banner page. However, these indicia are only singularly detected in any given system. Furthermore, there is no suggestion in the art to identify a differentiation of settings as between the first and second consecutive pages of the print job data stream. In contrast, detecting two or more separate classes of indicia under the present invention or detecting a differentiation of settings within a class within the first two pages provides a more reliable and robust system for identifying a banner page.

Under the present invention, the detection of any class of indicia is accomplished using conventional means. For example, a job boundary is detected by sensing an out-of-band job boundary signal (i.e., a network connection close) in association with identifying conventional PJL commands that are indicative of a new job. Similarly, the PDL language, page closing, or other print settings are identified by the known PDL commands.

Complexity of a page is identified by evaluating how much text versus how much vector or graphical image (i.e., raster data) exists on the page. For example, a page of text only strongly suggests a banner page, whereas a page having some text with a minimal amount of vector data might minimally suggest a banner page. On the other hand, a page of only vector or raster data strongly suggests it is not a banner page.

Because a banner page is typically exactly one page, if the first page in a data stream appears to be "tacked on" to the front of a well-formed PJL-enveloped data stream, then the first page is very likely a banner page. A page that appears to be "tacked on" to the print job is identified by detecting a job boundary, a page of data, and a PJL command closely following the page of data with no further immediate job boundary detect. To this regard, FIGS. 2A–D are block diagrams depicting various configurations of a print job data stream. As will be seen in these figures, a banner page that appears to be "tacked on" to the job may or may not be enveloped (wrapped) in its own PJL commands relative to the job boundary detect, or it may be sub-enveloped (sub-nested) in PJL commands relative to the entire print job data stream that is enveloped in PJL commands. Alternatively, although not shown in the figures, a banner page that appears to be "tacked on" to the job may be enveloped in PJL commands and yet the rest of the pages of the print job may not necessarily be enveloped in PJL commands.

Figure 2D:
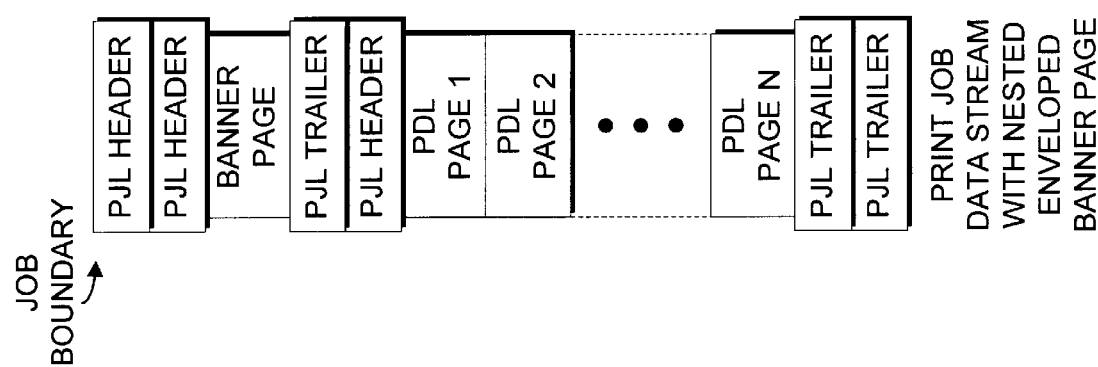
FIGS. 2A–D are block diagrams depicting variations of a print job data stream.
Figure 2C:
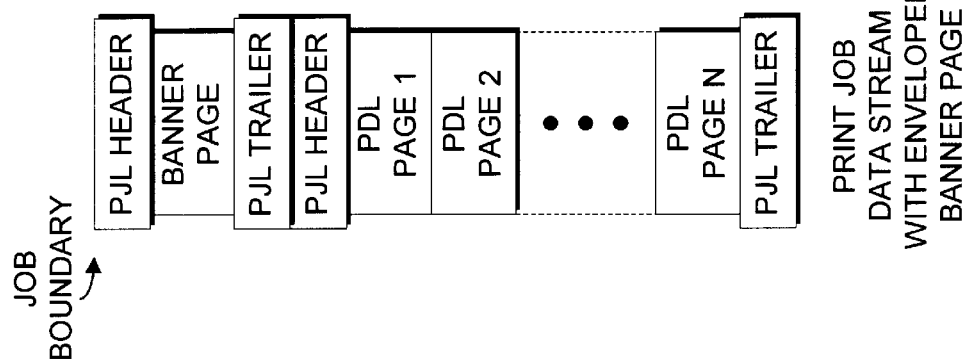
Figure 2B:
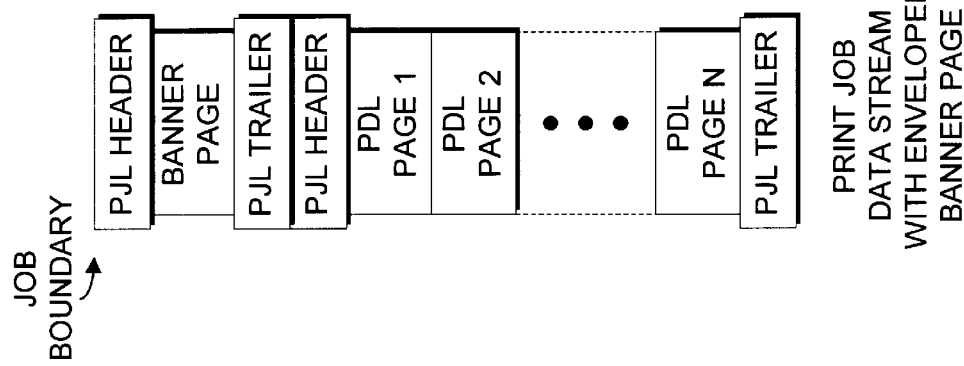
Figure 2A:
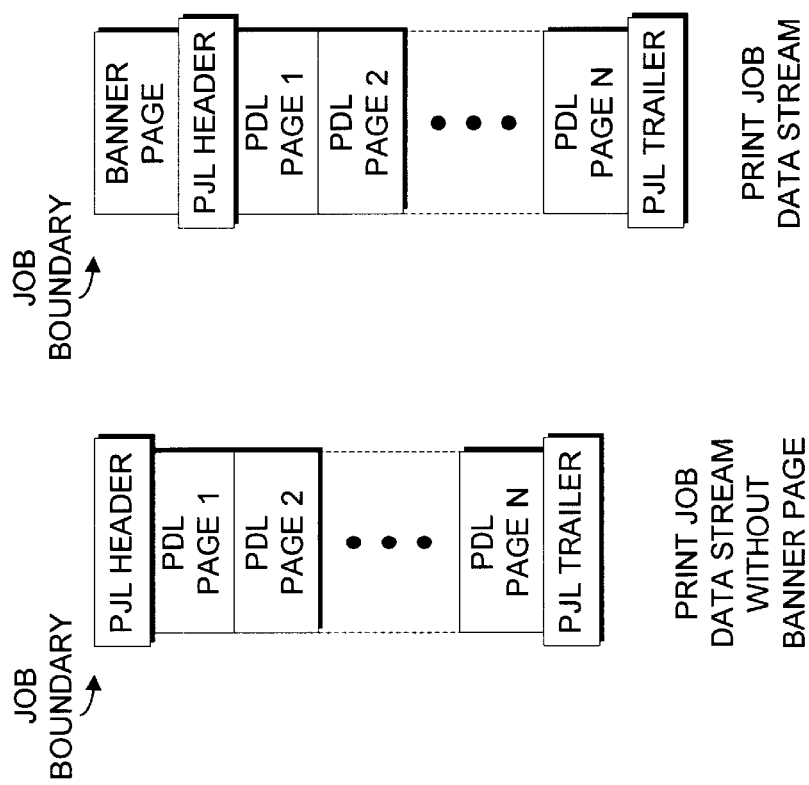

Referring now to the figures individually, FIG. 2A is a block diagram depicting a conventional PJL wrapped print job data stream having no banner page. The data stream is configured with a PJL header followed by multiple PDL pages of data (PDL page 1, PDL page 2, . . . PDL page N) and a PJL trailer. In this context, the PJL commands envelope the PDL pages to define the print job. The present invention identifies this data stream as not having a banner page because there is not a first page that appears to be "tacked on" to the job. Namely, after the job boundary detect, all of the pages are enveloped in the single set of matching PJL header and trailer commands. More specifically, after the boundary detect and first page of data there is not a closely following PJL command.

FIG. 2B is a block diagram depicting a conventional print job data stream having a PDL defined banner page (or it could be a text defined banner page) that is not enveloped in PJL commands. However, the actual print job data is enveloped with a PJL header followed by multiple PDL pages of data (PDL page 1, PDL page 2, . . . PDL page N) and then a PJL trailer. The present invention identifies this data stream as having a banner page because there is a first page (i.e., the banner page) that appears to be "tacked on" to the job. After the job boundary detect, although the first (banner) page is not enveloped in PJL, there is a PJL header closely following the first page without another boundary detect.

FIG. 2C is a block diagram depicting a conventional print job data stream having a banner page that is enveloped in PJL commands. Additionally, the actual print job (PDL page 1, PDL page 2, . . . PDL page N) is separately enveloped in PJL commands. The present invention identifies this data stream as having a banner page because, again, the first (banner) page appears to be "tacked on" to the job. After the job boundary detect, even though the first (banner) page is enveloped in PJL, there is a PJL header closely following the first page without another job boundary detect.

FIG. 2D is a block diagram depicting a conventional print job data stream that has a banner page enveloped in PJL commands, an actual print job (PDL page 1, PDL page 2, . . . PDL page N) enveloped in PJL commands, and the entire data stream additionally enveloped in PJL commands. This example depicts nested PJL commands. The present invention identifies this data stream as having a banner page because, again, the first (banner) page appears to be "tacked on" to the job. After the job boundary detect, although the first (banner) page and the actual print job are both nested enveloped in PJL, there is a PJL header closely following the first page and no additional job boundary detect.

Moving away now from "tacked on" detection, a differentiation of print settings as between the first and second consecutive pages in a print job data stream may include differences in any one or more of the following classes of indicia: resolution, printer description language used, color characteristics, input bin selection, output bin destination, finishing operations selected, page size, page orientation, duplex mode, etc. Notably, each of these print settings as between the first and second consecutive pages describes a separate class of indicia for detection purposes. For example, resolution detected may be 600 or 1200 dpi, or finishing operations detected may be registering, binding, stapling or punching.

Finally, for banner page detection purposes, whatever the classes or criteria of indicia, the present invention banner page manager 60 identifies at least two of the separate classes to determine whether or not a banner page exists in the print job data stream. Importantly, using at least two classes of indicia reduces the likelihood of false banner page detection.

Figure 3:
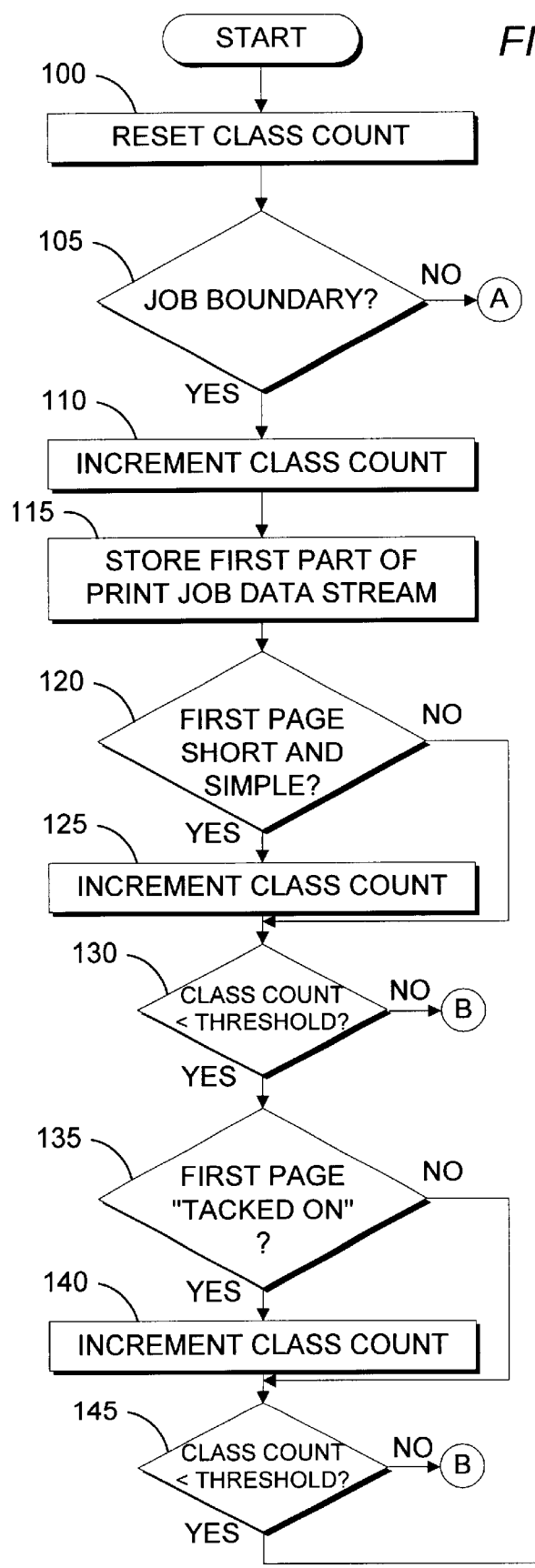
FIG. 3 is a flow chart depicting a preferred method for determining whether or not a banner page exists in a print job data stream.

Referring now to FIG. 3, a flow chart depicts a preferred method for identifying the separate classes of indicia in the print job data stream to determine whether or not a banner page exists. First, a "class count" counter is reset 100. The class count tracks the number of separate classes of indicia that are identified in the data stream. The class count is later compared to a threshold value for determining if a banner page is detected.

Next, if a job boundary is not detected 105, then it is certain that we are not at the beginning of a print job. Thus, we do not have a banner page 165 since banner pages only occur at the beginning of the print job data stream. However, in the event a job boundary is detected 105, the class count is incremented 110 and a portion of the data stream is stored 115 in memory 50 sufficient to capture what may be a banner page. This stored portion will be termed herein as the lead portion. Since banner pages are usually small, in one preferred embodiment the first 30K bytes are stored prior to generating the display list. Alternatively, the display list is generated and stored as normally occurs. In either case, determination of whether or not a banner page exists occurs with respect to the stored lead portion.

Next, at least two class criteria evaluations are made upon the lead portion of the data stream. Specifically, for example, if the first page is short and simple 120 (for example, less than 25K bytes and consists of text only data and not vector or raster graphic commands), then it is possible we may have a banner page. Consequently, the class count is incremented 125 and then compared to a threshold value 130. On the other hand, if the first page is not short and simple, then the class count is not incremented.

The threshold value is set relative to system design criteria and preferences. For example, if it is desired that only a minimum number of classes be identified in the data stream for detecting a banner page, then the threshold value may be set to two. On the other hand, if it is desired that a higher certainty be made relative to detecting a banner page, then the threshold may be set to some value greater than two (up to the maximum number of class/criteria evaluation performed). In any case, whatever the threshold is set to be, if the threshold is met 130 (i.e., if the class count is equal to or greater than the threshold), then it is determined that the first page is a banner page 170. On the other hand, if the threshold is not met (i.e., if the class count is less than the threshold), then further analysis is performed. Namely, the print data is further analyzed to detect any further classes of criteria which may be indicative of the existence of a banner page in the data.

To this regard, a next step is to determine whether a first page of data appears to be "tacked on" 135 to the job (see the earlier discussion concerning "tacked on"). If the first page appears to be "tacked on" 135, then it is possible we may have a banner page. Consequently, the class count is incremented 140 and then compared to the threshold value 145. Again, if the threshold is met, then it is determined that the first page is a banner page 170. On the other hand, if the first page is not "tacked on" 135, then the class count is not incremented and, of course, the threshold is not yet met so the analysis is continued.

Now, furthering the analysis, if a second page is detected 150 and if it embodies characteristics that differ from the first page in the data stream then, again, we may have a banner page. Consequently, the class count is incremented 155 and then compared to the threshold value 160. Again, if the threshold is met 160, then it is determined that the first page is a banner page 170. On the other hand, if the second page characteristics do not differ from the first page 150, then the class count is not incremented, the threshold is not yet met, and so it is determined that the first page is not a banner page 165.

It should be noted here that the detection of banner page criteria in FIG. 3 is shown as simplistic steps for ease of drawing and discussion purposes only. Obviously, each evaluation step typically includes more analysis as previously discussed relative to each criteria. For example, whether the first page is different from the second page 150 may actually include multiple analyses, including analysis of any one or more print setting differences such as resolution, printer description language used, color characteristics, input bin selection, output bin destination, finishing operations selected, page size, page orientation, duplex mode, etc.

Additionally, although these steps outlined in FIG. 3 reflect one preferred method for detecting the banner page, it will be obvious to those of ordinary skill in the art that variations in the classes or criteria evaluated, order of evaluation, and/or threshold used are similarly contemplated under the present invention. Accordingly, FIG. 3 is meant to represent a high level perspective of one preferred method and not necessarily the only method.

Now, importantly, once the banner page is identified in the print job data stream, the present invention banner page manager 60 is then able to manage and control actual usage of the banner page independent of other pages defined in the print job data stream submitted to the printer 10. The banner page is managed independent of other pages in the print job because it is acted upon separately and differently from the other pages. This independent management capability includes, optionally, controlling resolution of the banner page, controlling inclusion or exclusion of the banner page relative to a job (for example, relative to finishing operations or relative to a specified number of copies output of the job), controlling output quantity of the banner page, controlling input tray and/or output tray selection for the banner page, controlling duplexing or non-duplexing of the banner page, controlling relative location of the banner page with respect to the rest of the job (i.e., placing the banner page either at the front of the job or at the back of the job, depending upon page ordering or face up/down orientation of the job), controlling registration offsetting of the banner page relative to the rest of the job, controlling margin printing for the banner page, controlling color, and/or controlling other banner page usages with respect to printer 10.

Controlling the resolution of the banner page includes, for example, optimizing its resolution such that throughput of multiple print jobs in the printer is enhanced. Alternatively, controlling the resolution may include effectuating a "toner save" mode upon the banner page to reduce toner consumption. Controlling color includes, for example, forcing the banner page to print in black only, or some other specified color, to optimize throughput.

Optimizing the resolution of the banner page includes forcing the resolution to depend upon analysis of a resolution of a last page of a previous print job and upon an analysis of a resolution of a second page of a current print job (assuming the first page is detected as a banner page). Typically, higher resolution pages take longer to print than lower resolution pages. Thus, since banner pages are normally a discarded item, they do not always need to be printed with the same high resolution as the rest of the print job. Therefore, to increase printer throughput, the present invention prints a banner page at a lower resolution than the rest of its associated print job, when it is optimal to do so, to increase the overall printer throughput.

Several factors affect the determination of what the optimal banner page resolution is for best print throughput. For example, a change in resolution may require the page pipeline to be flushed, and flushing requires waiting for all previously processed/printed pages to drop into the appropriate output bin before starting printing of the next page. In a high end printer, multiple pages can be in the pipeline at one time, thus causing a significant amount of delay time before flushing is complete. Additionally, a change in resolution also typically requires a memory reconfiguration and a loss of font cache, both of which can also reduce overall print throughput. Thus, given these considerations, a banner page is printed at a lower resolution only when it is optimal to do so.

For example, referring now to the following Table 1, a matrix identifies an optimal resolution for a current banner page relative to a previous print job. In this example, it is assumed printer 10 is at least 600 and 1200 dpi resolution capable. As such, in exemplary configuration "A", if the last page of a previous job is at 600 dpi, and the second page (assuming the first page is a banner page) of the current job (or, it could be said, next job) is also at 600 dpi, then the optimum banner page resolution is also 600 dpi. Thus, in this instance, the resolution of the current banner page is already at the optimum resolution and no changes need occur. However, in configuration "B", if the last page of a previous job is at 600 dpi, and the second page of the current job is at 1200 dpi, then the optimum banner page resolution is at 600 dpi. Thus, in this instance, the banner page of the current print job is printed at 600 dpi, similar to that of the previous print job, and only then is the rest of the current print job printed at its originally designated 1200 dpi. In effect, the change in resolution to 1200 dpi is delayed thereby presenting an improvement in overall throughput performance.

In configuration "C", if the last page of the previous job is at 1200 dpi, and the second page of the current job is at 600, then the optimum banner page resolution is 600. Finally, in configuration "D", if the last page of the previous job is at 1200 dpi, and the second page of the current job is at 1200, then the optimum banner page is also 1200. No change is needed to optimize the printer throughput. In fact, a change to 600 at this point might cause overall throughput to be slowed because of the required time necessary to flush the pipeline, reconfigure the memory, and change the font sizing. Any benefit that would be obtained by printing the banner at a lower resolution than the previous and current print jobs is offset by the detriment incurred to change the resolution. Thus, the resolution is not changed in example "D".

TABLE 1

| Exemplary Configuration | Last Page of Previous Job | Second Page of Current Job | Optimum Banner Page Resolution |
|---|---|---|---|
| A | 600 | 600 | 600 |
| B | 600 | 1200 | 600 |
| C | 1200 | 600 | 600 |
| D | 1200 | 1200 | 1200 |

Figure 4:
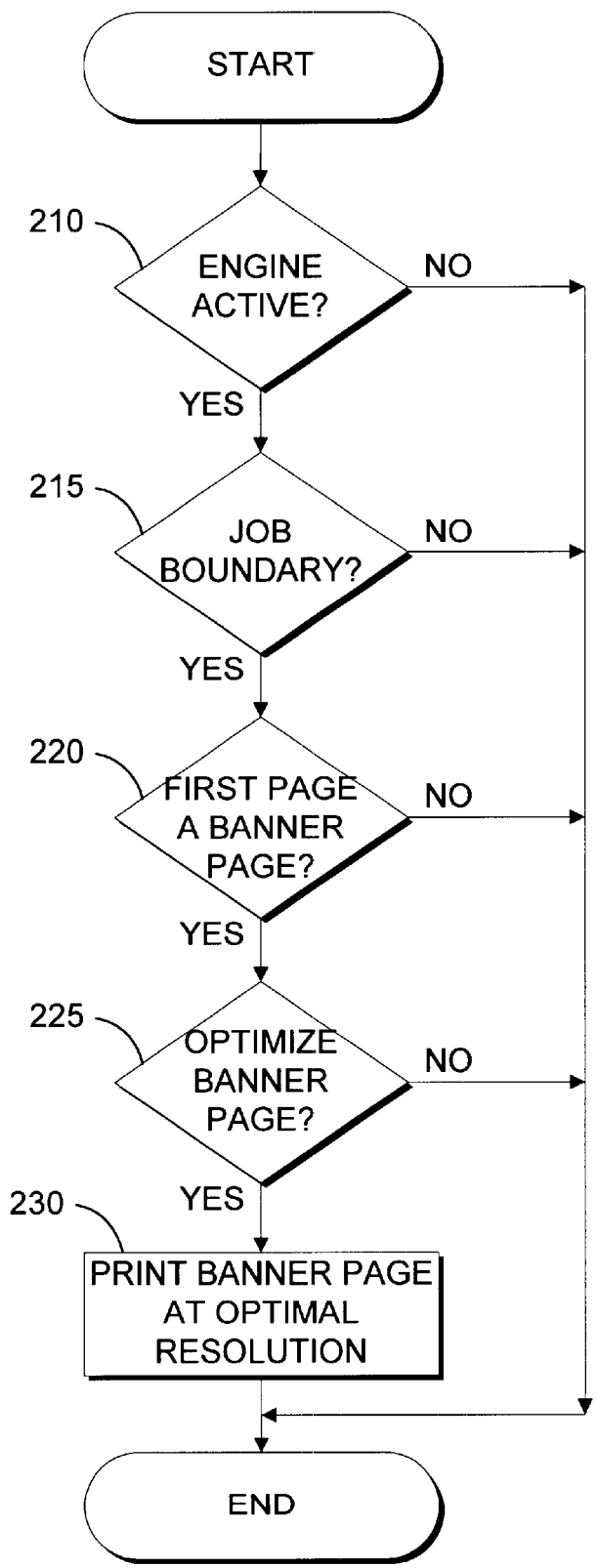
FIG. 4 is a flow chart depicting a preferred method for optimizing banner page resolution.

Referring now to FIG. 4, a flow chart depicts a preferred method for printing a banner page at optimal resolution as described in reference to Table 1. Specifically, if the engine is active 210 (for example, if a page is currently moving through the printer), and a job boundary is detected 215, and the first page is a banner page 220 (see FIG. 2) that needs to be optimized 225 (see Table 1), then the current banner page stored in the memory 50 is printed at the optimal resolution. Otherwise, if these criteria are not met, but there is a banner page, then it is printed at the default resolution dictated by the print job with which it is associated. No further optimizing need occur.

Figure 5:
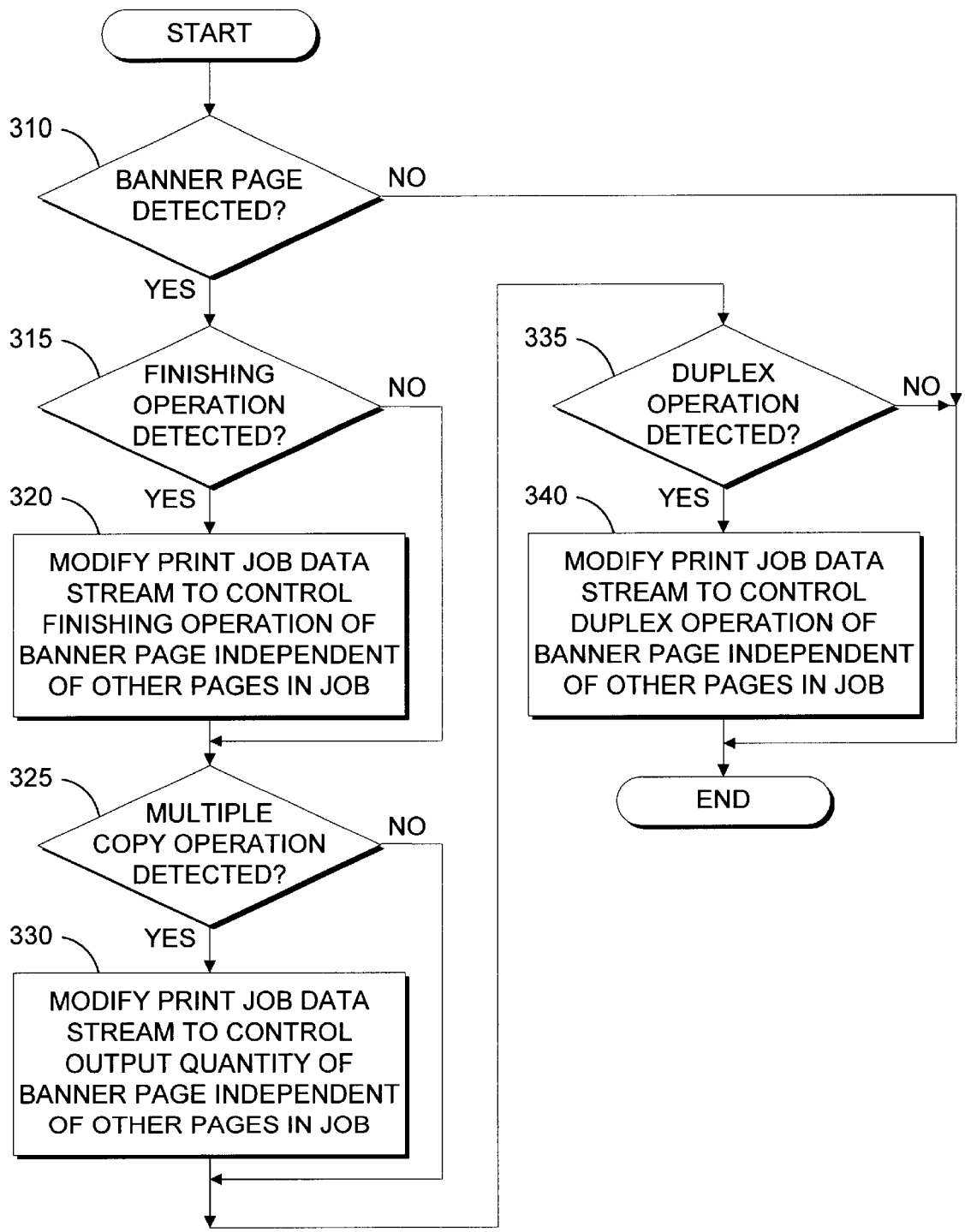
FIG. 5 is a flow chart depicting a preferred method for managing usage of a banner page.

Referring now to FIG. 5, a flowchart depicts a high level preferred method for managing usage of the banner page independent of other pages defined in the print job data stream. FIG. 5 depicts an exemplary context of detecting and modifying the print settings of finishing operations, output quantity and duplexing for the banner page. However, it should be noted that other banner page management options (such as those previously discussed) are similarly feasible and considered under the present invention but are not shown in FIG. 5 simply because there are too many. Importantly, though, each option is managed in a method similar to those shown in FIG. 5 such that the banner page is controlled independent of other pages defined in the print job data stream.

To this regard, once a banner page is detected 310, the print job data stream is further parsed (either subsequent to or substantially simultaneously with the parsing and detecting of the banner page) by banner page manager 60 to detect and manage the banner page options, if any, found in the job. For example, in the event a finishing operation stapling command is detected 315 (typically within the PJL commands), then the stapling operation is controlled (or modified) 320 such that the banner page is not stapled to the rest of the output set of the print job. Namely, as an example, if the data stream includes a print job document having ten pages (i.e., in a document sub-job of the data stream), and the data stream also includes a banner page (i.e., in a banner page sub-job of the data stream), then the job data stream is modified to staple the ten pages together and to not staple the banner page to the ten pages.

A preferred method for accomplishing this 320 is to insert (or delete) appropriate PJL commands or PDL commands in the print job data stream at proper locations. As an example, this might include inserting a PJL command at the end of the banner page sub-job, or at the beginning of the document sub-job, that directs the stapling output tray to pass (or drop) the banner page into the final job-completed output tray. Thus, only the ten page document sub-job is stapled in the stapling tray before being passed to the final job-completed output tray.

As an alternative to modifying the PJL/PDL commands for controlling usage of the banner page 320, the display list that is produced from the parsing of the print job data stream may also be acted upon or modified. In either case, or regardless of any other method used, the ultimate result is enhanced control and usage of the banner page under principles of the present invention.

Now, furthering the analysis, in the event a multiple original copy (MOPY) print job is detected 325 (or if a conventional multiple copy job is detected) in the print job data stream, then the output quantity of the banner page is limited to a single output 330. Specifically, for example, if a MOPY job is detected in the data stream to produce multiple original prints (sets), then rather than printing the banner page with each set, the present invention modifies the print job data stream 330 to print the banner page only once if all the sets are to be ultimately sent to a single output tray 35. Alternatively, if a banner page is not desired at all, then the stream is modified 330 such that no banner page is printed.

As a last example, in the event a duplex operation is detected 335 in the print job data stream, then the data stream is modified 340 to not duplex the banner page (sub-job) and to enable only the document (sub-job) to be duplexed.

Again, any of these modification steps 320, 330, 340 are accomplished by modifying the print job data stream (either before or after display list generation) at proper locations with appropriate commands. For example, before the display list is generated, PJL commands may be inserted into the banner page sub-job to control the banner page as desired and independent of the rest of the pages in the print job.

Clearly, banner page manager 60 enables controlling of the banner page independent of the rest of the print job for a variety of features beyond those described in FIG. 5, including, additionally, input tray selection, output tray designation, designating output location of the banner page relative to the top or bottom of the document stack, offsetting, margin printing, etc.

Finally, what has been described are preferred embodiments for a banner page detection and handling mechanism and method. It will be obvious to one of ordinary skill in the art that the present invention is easily implemented utilizing any of a variety of components existing in the art. Moreover, while the present invention has been described by reference to specific embodiments, it will be apparent that other alternative embodiments and methods of implementation or modification may be employed without departing from the true spirit and scope of the invention.

What is claimed is:

1. An image forming device, comprising:
   (a) an input for receiving a print job data stream;
   (b) a memory coupled to the input for storing at least a portion of the print job data stream; and,
   (c) detection apparatus coupled to the memory, the detection apparatus configured to detect at least two separate classes of indicia indicative of a banner page within the portion of the print job data stream.

2. The image forming device of claim 1 wherein the detection apparatus comprises software, firmware or circuitry, or any combination thereof.

3. The image forming device of claim 1 wherein the indicia includes a job boundary.

4. The image forming device of claim 1 wherein the indicia includes a page closing.

5. The image forming device of claim 1 wherein the indicia includes complexity of a page.

6. The image forming device of claim 5 wherein the complexity of a page is defined by comparative analysis of any text, vector or raster data on the page.

7. The image forming device of claim 1 wherein the indicia includes indication of a tacked on page.

8. The image forming device of claim 1 wherein the indicia includes a differentiation of settings as between a first and second consecutive pages in the print job data stream.

9. The image forming device of claim 8 wherein the settings include, selectively: resolution, printer description language used, color, input bin selection, output bin destination, finishing operations, page size, page orientation, or duplex mode.

10. The image forming device of claim 1 further including management apparatus coupled to the detection apparatus, wherein the management apparatus is configured to manage usage of the banner page in the image forming device independent of other pages defined in the print job data stream.

11. The image forming device of claim 10 wherein the management apparatus is configured to control resolution of the banner page independent of other pages defined in the print job data stream.

12. The image forming device of claim 11 wherein the resolution of the banner page is optimized such that throughput of multiple print jobs in the image forming device is enhanced.

13. The image forming device of claim 11 wherein the resolution of the banner page is optimized depending upon analysis of a resolution of a portion of a previous print job and a portion of a current print job.

14. The image forming device of claim 10 wherein the management apparatus is configured to control output quantity of the banner page independent of other pages defined in the print job data stream.

15. The image forming device of claim 14 wherein the output quantity of the banner page is limited to a single output in the event a print job is output as a multiple copy print job.

16. The image forming device of claim 10 wherein the management apparatus is configured to exclude output of the banner page on the image forming device and enable output of other pages defined in the print job data stream on the image forming device.

17. The image forming device of claim 10 wherein the management apparatus is configured to control input tray or output tray selection for the banner page as being different from other pages defined in the print job data stream.

18. The image forming device of claim 10 wherein the management apparatus is configured to control duplexing or non-duplexing of the banner page as being different from other pages defined in the print job data stream.

19. The image forming device of claim 10 wherein the management apparatus is configured to control output order of the banner page relative to other pages defined in the print job data stream.

20. The image forming device of claim 10 wherein the management apparatus is configured to output offset register the banner page differently from other pages defined in the print job data stream.

21. The image forming device of claim 10 wherein the management apparatus is configured to control margin printing for the banner page differently from other pages defined in the print job data stream.

22. A method of detecting a banner page associated with a print job data stream in an image forming device, comprising:

(a) reading at least a portion of the print job data stream; and, (b) detecting at least two separate classes of indicia indicative of a banner page within the at least a portion of the print job data stream.

23. The method of claim 22 wherein the indicia includes a job boundary.

24. The method of claim 22 wherein the indicia includes a page closing.

25. The method of claim 22 wherein the indicia includes complexity of a page.

26. The method of claim 25 wherein the complexity of a page is defined by comparative analysis of any text, vector or raster data on the page.

27. The method of claim 22 wherein the indicia includes indication of a tacked on page.

28. The method of claim 22 wherein the indicia includes a differentiation of settings as between a first and second consecutive pages in the print job data stream.

29. The method of claim 28 wherein the settings include, selectively: resolution, printer description language used, color, input bin selection, output bin destination, finishing operations, page size, page orientation, or duplex mode.

30. The method of claim 22 further including managing usage of the banner page in the image forming device independent of other pages defined in the print job data stream.

31. The method of claim 22 further including controlling resolution of the banner page independent of other pages defined in the print job data stream.

32. The method of claim 22 further including optimizing resolution of the banner page such that throughput of multiple print jobs in the image forming device is enhanced.

33. The method of claim 32 wherein the resolution of the banner page is optimized depending upon analysis of a resolution of a portion of a previous print job and a portion of a current print job.

34. The method of claim 22 further including controlling an output quantity of the banner page independent of other pages defined in the print job data stream.

35. The method of claim 22 further including limiting an output quantity of the banner page to a single output in the event a print job is output as a multiple copy print job.

36. The method of claim 22 further including excluding output of the banner page on the image forming device while enabling output of other pages defined in the print job data stream on the image forming device.

37. The method of claim 22 further including controlling input tray or output tray selection of the banner page differently from other pages defined in the print job data stream.

38. The method of claim 22 further including controlling duplexing or non-duplexing of the banner page differently from other pages defined in the print job data stream.

39. The method of claim 22 further including controlling an output order of the banner page relative to other pages defined in the print job data stream.

40. The method of claim 22 further including output offset registering the banner page differently from other pages defined in the print job data stream.

41. The method of claim 22 further including controlling margin printing of the banner page differently from other pages defined in the print job data stream.

42. A computer-readable medium having computer-executable instructions for performing steps for detecting a banner page in a print job data stream of an imaging device, the steps including:
  (a) reading at least a portion of the print job data stream; and,
  (b) detecting at least two separate classes of indicia indicative of a banner page within the at least a portion of the print job data stream.

43. The computer-readable medium of claim 42 further including computer-executable instructions for performing steps for managing the banner page in the image forming device independent of other pages defined in the print job data stream.

44. An image forming device, comprising:
  (a) an input for receiving a print job data stream;
  (b) a memory coupled to the input for storing at least a portion of the print job data stream;
  (c) detection apparatus coupled to the memory and configured to detect at least two separate classes of indicia indicative of a banner page within the portion of the print job data stream; and,
  (d) management apparatus coupled to the detection apparatus and configured to manage usage of the banner page independent of other pages defined in the print job data stream.

45. A method of managing a banner page associated with a print job data stream in an image forming device, comprising:
  (a) reading at least a portion of the print job data stream;
  (b) detecting at least two separate classes of indicia indicative of a banner page within the at least a portion of the print job data stream; and,
  (c) managing usage of the banner page independent of other pages defined in the print job data stream in the image forming device.

* * * * *